United States Patent [19]
Fitchmun et al.

[11] Patent Number: 5,390,430
[45] Date of Patent: Feb. 21, 1995

[54] SHOE SOLE CONSTRUCTED OF COMPOSITE THERMOPLASTIC MATERIAL INCLUDING A COMPLIANT LAYER

[75] Inventors: Douglas R. Fitchmun, Woodland Hills; Niran Perera, Simi Valley, both of Calif.

[73] Assignee: Medical Materials Corporation, Camarillo, Calif.

[21] Appl. No.: 267,185

[22] Filed: Jun. 28, 1994

Related U.S. Application Data

[62] Division of Ser. No. 746,740, Aug. 19, 1991, Pat. No. 5,338,600.

[51] Int. Cl.$^6$ .................... A43B 13/18; A43B 13/12
[52] U.S. Cl. ..................... 36/30 R; 36/25 R
[58] Field of Search ............ 36/30 R, 25 R, 28

[56] References Cited

U.S. PATENT DOCUMENTS

| | | | |
|---|---|---|---|
| 2,530,441 | 11/1950 | Reinhardt et al. | 36/30 R |
| 4,481,726 | 11/1984 | Phillips | 36/30 R |
| 4,894,933 | 1/1990 | Tonkel et al. | 36/30 R |
| 5,052,130 | 10/1991 | Barry et al. | 36/30 R |

*Primary Examiner*—Steven N. Meyers
*Attorney, Agent, or Firm*—Ellsworth R. Roston; Charles H. Schwartz

[57] ABSTRACT

A thermoformable thermoplastic composite material has a core sufficiently thick to provide for a shaping of the composite material at an elevated temperature to any desired configuration. Layers of a fabric material disposed on opposite sides of the core may be formed of glass, carbon or aramid and from woven fibers, unidirectional or chopped fibers or random strand mats. The fabric layers are sufficiently thick to impart strength and rigidity to the composite material. Layers of a thermoplastic thermoformable resin material may be disposed on the fabric layers. The thermoplastic layers impregnate the fabric layers, bond the fabric layers to the core and provide a smooth external surface to the composite material. The core is preferably thinner than the combined thicknesses of the fabric layers and the thermoplastic layers. For example, the thickness of each fabric layer may be 0.008"–0.009", of each thermoplastic layer may be 0.0005"–0.002" and of the thermoplastic composite material may be 0.035"–0.060". A thermoplastic layer of an elastomer such as urethane is bonded to one of the thermoplastic layers with a thickness of approximately 0.010"–0.020" to impart abrasion resistance and high impact strength to the thermoplastic composite material. The composite material may illustratively be disposed externally in the sole of a shoe with the elastomer facing outwardly.

5 Claims, 2 Drawing Sheets

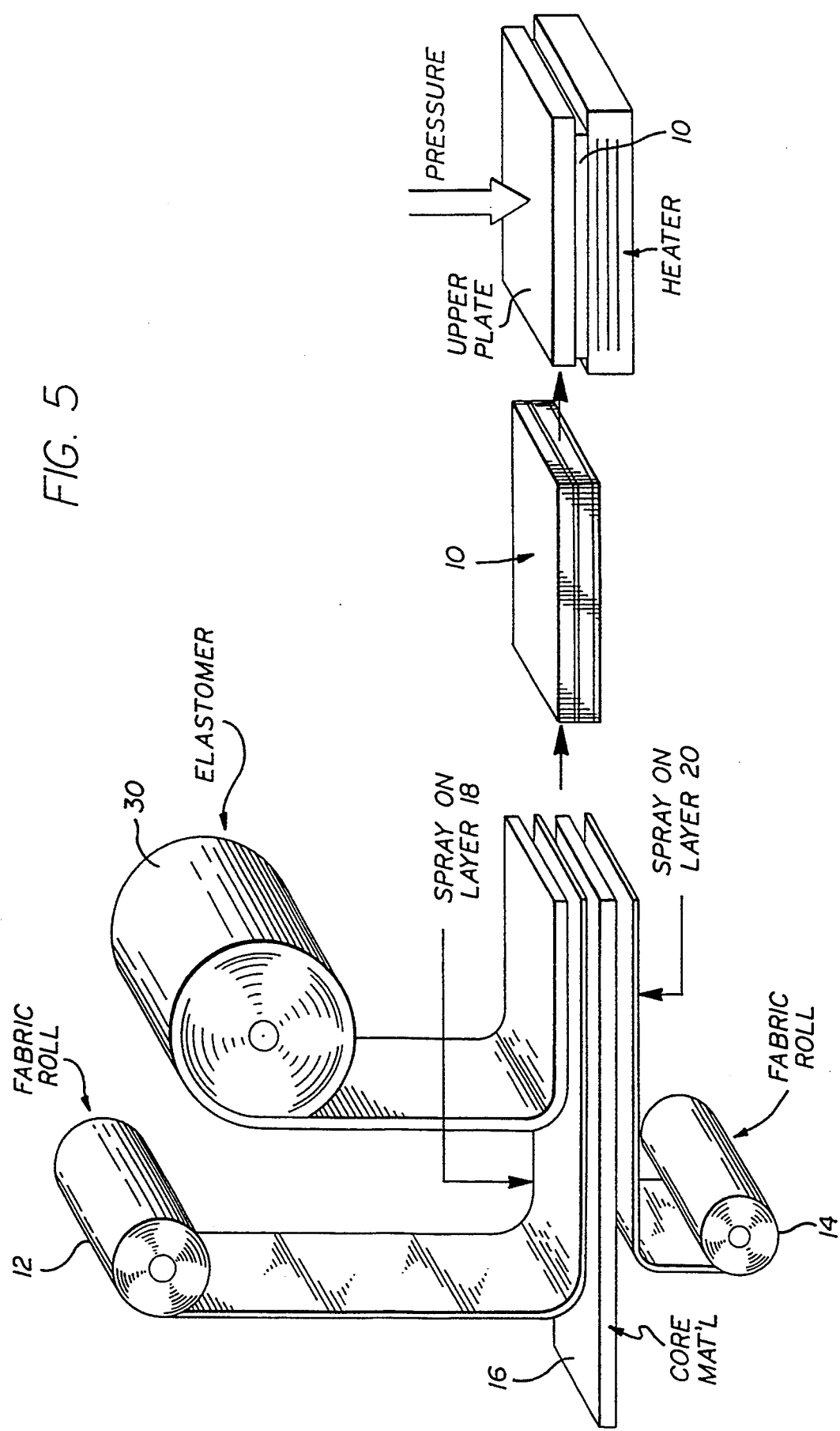

SHOE SOLE CONSTRUCTED OF COMPOSITE THERMOPLASTIC MATERIAL INCLUDING A COMPLIANT LAYER

This is a division of application Ser. No. 07/746,740, filed Aug. 19, 1991, now U.S. Pat. No. 5,338,600.

This invention relates to a thermoformable thermoplastic composite material which is strong and light and which is capable of being thermally deformed to any desired shape without buckling or rippling of the composite material. The invention further relates to a thermoplastic composite material which is strong, has abrasion resistance, and high impact strength.

It is often desirable to form a sheet of plastic material into a complex shape without any rippling or buckling of the material. It is also desirable to make such sheet as light (from a weight standpoint), thin and strong as possible. It is also desirable to form a sheet with the above characteristics into the complex shape in a relatively simple process so that the costs of providing the complex shape in the sheet are low and so that the yield of the final product is high.

A sheet with the properties discussed may have a wide variety of different uses. For example, it may be shaped to conform to the shape of a foot. Alternatively, the sheet may be shaped to provide an arch support in a shoe. As another example, the sheet may be shaped to be disposed as a spring element in the sole of a wearer's shoe. Although the examples have been limited to uses in shoes, this is only one of a number of different fields or areas in which such material can be used.

Thermoplastic materials have been used to provide sheets with the properties discussed above. To obtain a desired shape, a mold is provided with the desired shape. The thermoplastic material is then formed into the desired shape by applying heat and pressure to the thermoplastic material to move the material into the mold and to have the material adapt to the configuration of the mold. Suitable thermoplastic materials for forming into complex shapes may be any suitable thermoplastic material such as acrylics, polypropylenes and polyethylenes.

Thermoplastic materials are advantageous because they can be reshaped if it is desired to change the configuration somewhat after the material has been initially shaped through the application of heat and pressure. However, thermoplastic materials are distinctly disadvantageous in that they have to be provided with a considerable thickness in order to provide the necessary rigidity in such applications as orthotics. For example, thicknesses of 0.120" to 0.200" may be required. Unfortunately, such thick materials have been too thick to be disposed in foot gear. Furthermore, the thermoplastic materials have not been as durable and resistant to breaking as would otherwise be required. The thermoplastic materials have also sometimes buckled and rippled when they have been transformed into complex shapes.

Thermosetting materials have also been used to provide complex shapes such as for footwear and orthotic applications. An advantage of a thermosetting material is that it can be made quite thin to obtain the desired shape. For example, the thickness of the thermosetting material may be in the order of 0.065" to 0.080". One problem with shaping thermosetting materials into complex shapes is that the thermosetting materials have to be shaped properly the first time. The reason is that the thermosetting materials cannot be reshaped after they have been heated to a temperature for initially shaping the material. This problem has severely limited the use of thermosetting materials to provide complex shapes. Another problem often has been that the thermosetting materials tend to be heavy even though they have been thin.

Until recently, because of the problems discussed above for thermosetting materials, complex shapes such as for orthotic inserts have generally been formed from thermoplastic materials such as acrylics and polypropylenes. The orthotic inserts have been formed by initially making a plaster mold from the patient's foot. This plaster mold has formed a negative image of the patient's foot. A positive mold has then been made from the negative plaster mold. Thermoplastic material has then been transformed into the desired shape by using heat and pressure to conform the thermoplastic material to the positive mold.

U.S. Pat. No. 4,778,717 issued to me on Oct. 18, 1988, for a "Thermoplastic Thermoformable Composite Material" and assigned of record to the assignee of record of this application discloses and claims a composite thermoplastic material which can be easily formed, and even reformed if necessary, at elevated temperatures to any desired complex shape. The composite material is light and strong and is able to be thermally deformed, and even reformed, to any desired shape with relatively minimal buckling or rippling. U.S. Pat. No. 4,778,717 is made of reference to provide a background for the improvement constituting this invention and also to complete any disclosure in this application of the construction and formation of the composite material.

The composite material of U.S. Pat. No. 4,778,717 is formed from a core material of a thermoplastic resin material and a pair of layers of fabric material disposed on the opposite sides of the core material. Layers of thermoplastic material envelope and impregnate the layers of the fabric material and bond the layers of the fabric material to the core. The layers of the fabric material have a total thickness sufficient to impart strength and rigidity to the composite material. The core is of a sufficient thickness to provide for a shaping of the composite thermoplastic material at an elevated temperature to any desired shape or configuration with relatively little rippling or buckling of the fabric material. The composite material of U.S. Pat. No. 4,778,717 has received widespread acceptance for orthotics.

This invention provides a thermoplastic thermoformable composite material which constitutes an improvement over the composite material of U.S. Pat. No. 4,778,717. In one embodiment of the invention, a thermoplastic thermoformable resin material defines a core of a thermoformable thermoplastic composite material. The core is sufficiently thick to provide for a shaping of the composite material at an elevated temperature to any desired configuration.

First and second layers of a fabric material are respectively disposed on opposite sides of the core. The fabric material may be formed of glass, carbon or aramid and may be formed from woven fibers, unidirectional or chopped fibers or random strand mats. The fabric layers have a total thickness sufficient to impart strength and rigidity to the composite material. Layers of a thermoplastic thermoformable resin material may be disposed on the outer layers of the fabric material. The thermoplastic layers impregnate the fabric layers, bond the fabric layers to the core and provide a smooth external surface to the composite material.

The core may be preferably thicker than the combined thicknesses of the fabric layers and the thermoplastic layers. For example, each of the fabric layers may have a thickness in the order of eight mils (0.008") to nine mils (0.009"). The thickness of each of the thermoplastic layers may be in the order of one half mil (0.0005") to two mils (0.002"). The total thickness of the thermoplastic composite material may be in the order of thirty five mils (0.035") to sixty mils (0.060").

A thermoplastic layer of an elastomer such as urethane is bonded to one of the thermoplastic layers with a suitable thickness to impart to the composite material abrasion resistance, high tear strength, a low modulus of elasticity and high elongation before breakage. This thermoplastic layer may have a thickness in the order of ten mils to twenty mils (0.010"-0.020"). The composite material including the thermoplastic material such as urethane may illustratively be disposed externally in the arch area of a shoe, with the elastomer material facing outwardly, to provide abrasion resistance and high impact strength to the composite material.

In the drawings:

FIG. 5 is a view schematically illustrating a method of forming the thermoplastic sheet material shown in FIG. 4.

Figure 4:
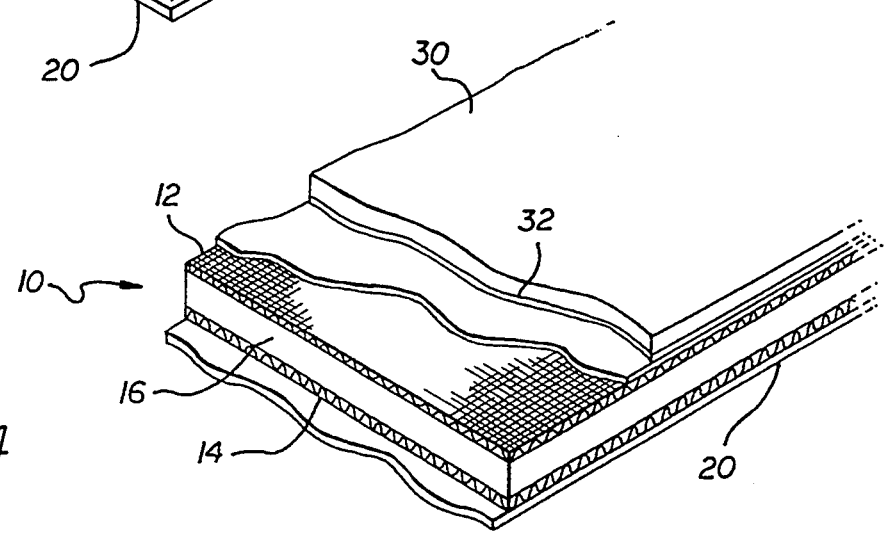
FIG. 4 is a fragmentary schematic perspective view of the thermoplastic composite material of this invention in sheet form.

FIG. 4 illustrates a thermoplastic thermoformable composite material generally indicated at 10 and constituting one embodiment of this invention. The composite material 10 includes a pair of layers 12 and 14 of a fabric material, preferably woven. The material for the fabric layers 12 and 14 may be made from fibers of a suitable material such as carbon, glass or aramid or a combination of these materials. The layers 12 and 14 may be formed from woven fibers, unidirectional or chopped fibers or continuous random strand mats. It will be appreciated that other materials or combinations of materials may also be used. Each of the layers 12 and 14 may be relatively thin. For example, the layers 12 and 14 may have a suitable thickness in the order of eight thousandths of an inch (0.008") to nine thousandths of an inch (0.009").

The composite material 10 also includes a core 16 made from a suitable thermoplastic thermoformable material (a resin). A suitable resin may be an acrylic although other thermoplastic composite materials such as a polycarbonate or ABS may be used. The core 16 is disposed between the layers 12 and 14 of the fabric material. The thickness of the core 16 is preferably considerably greater than the total thickness of the layers 12 and 14 of the fabric material. For example, the total thickness of the core 16 and the layers 12 and 14 of the fabric material may be approximately thirty five thousandths of an inch (0.035") to approximately sixty thousandths of an inch (0.060") when each of the layers 12 and 14 has a thickness in the order of 0.008" to 0.009".

As a first step in forming the composite material 10, the layer 12 of the fabric material is disposed against the core 16 on one side of the core. The layer 14 of fabric material is thereafter disposed against the core 16 on the other side of the core. As will be seen in FIG. 5, the layers 12, 14 and 16 may be disposed in the relationship described above by unwinding the core 16 and the layers 12 and 14 from rolls of material on a synchronized basis.

Although a preferred embodiment of the composite material has been described above, it will be appreciated that the thickness of the different layers of material can be varied through a wide range without departing from the scope of the invention. For example, the total thickness or volume of all of the different layers of fiber or fabric relative to the thickness of the core 16 may be between approximately forty percent (40%) and sixty percent (60%). The thickness or volume of the layers 12 and 14 of the fiber or fabric relative to the total thickness of the composite material 10 is dependent upon the use to be made of the composite material. For example, when the composite material is to be used for an orthotic insert, the thickness of the layers 12 and 14 of fabric or fiber relative to the thickness of the core 16 in the composite material 10 may approach the upper end of the range specified above.

Additional layers 18 and 20 (FIGS. 4 and 7) of a thermoplastic thermoformable resin material such as an acrylic may be respectively disposed on the layers 12 and 14 of the fabric material. Each of the layers 18 and 20 preferably has a thickness in the order of one half mil (0.0005") to two mils (0.002"). Each of the layers 18 and 20 respectively envelopes and impregnates the contiguous layers 12 and 14 of fabric material and bonds the layers of fabric material to the core 16.

The material of the layers 18 and 20 of resin material may be the same as, or different from, the material of the core 16. However, if the material of the layers 18 and 20 is different from the material of the core 16, the different materials have to be compatible so that they will form a unitary whole when extruded or molded into the composite material 10.

A layer 30 of a suitable thermoplastic material such as an elastomer is adhered to the layer of thermoplastic material. Preferably the elastomer 30 constitutes a urethane. A suitable urethane may be obtained from Dow Chemical under the trademark "Pellethane". The layer 30 may have a suitable thickness in the order of ten mils (0.010") to twenty mils (0.020"). Preferably the thickness of the layer 18 in the order of "0.0005-0.002". The layer 30 may be adhered or bonded to the layer 18 as by a hydroxyethyl methacrylate having a suitable ratio by weight to the urethane of approximately ten percent (10%).

The layer 30 has certain important advantages, particularly when it constitutes the layer facing the environment. For example, the layer 30 is abrasion resistant and resistant to the impact of particles such as small rocks and pebbles. When the layer 30 is disposed on the external surface of the shoe, small rocks or pebbles tend to impact the shoe when the wearer of the shoe walks, jogs or runs. The layer 30 minimizes any adverse effects of such impact because of its high impact strength.

The layer 30 has other important advantages. It has a low modulus of elasticity. This allows the layer to stretch and thereby adapt to different environment circumstances such as shearing forces on an article such as a shoe. It also has high elongation before it breaks. It additionally has a low compression set. This allows the material to return to or bounce back, to its pre-set condition when the layer is compressed by local conditions such as by impact against a rock in the ground. It also has low extractable levels. Because of this, the layer 30 will not dissolve very much when subjected to solvents.

During the formation of the different layers of the fabric materials, the resin material and the elastomer such as urethane into the composite material 10 as by laminating or molding the different layers, the additional layers 18 and 20 tend to facilitate the impregnation and encapsulation of the layers 12 and 14 of fabric material. Furthermore, they tend to cover the layers 14 and 16 of fabric material and provide a smooth external surface to these layers.

Before the composite material is formed, a layer 32 of the hydroxy methyl methacrylate is applied to the layer 30 of urethane and the layer 30 is disposed on the layer 18 with the layer 30 abutting the layer 18. The layers 12 and 14 of the fabric material, the core 16, the layers 18 and 20 of the thermoplastic material and the layer 30 of urethane are then extruded into a thin sheet of the composite material at a suitable temperature and pressure as shown in FIG. 5. FIG. 5 shows the additional layers 18 and 20 as being sprayed on the fabric layers 12 and 14. However, it will be appreciated that the layers 18 and 20 may be applied in different ways, such as in solid layers, on the fabric.

The particular temperature and pressure for providing the lamination of the different layers are dependent upon a number of parameters including the specific materials used for each of the layers 12, 14, 18, 20 and 30 and the particular material used for the core 16. The particular temperature and pressure are also dependent upon the specific thickness of each of the layers 12, 14, 18, 20 and 30 and the core 16 and the thickness of each of the layers relative to the thickness of the other layers. Although the formation of the composite material 10 as by a laminating process is preferred, the composite material may also be suitably formed as by a molding process.

As an illustrative example, assume that the core 16 is approximately fifteen thousandths of an inch (0.015″) thick and the composite material 10 is approximately sixty thousandths of an inch (0.060″) thick. Further assume that the core 16 is an acrylic and the layers 12 and 14 of fabric material are made from a carbon woven fabric as described above. Under such circumstances, the composite material 10 may be initially laminated for a period of approximately two (2) to three (3) minutes at a pressure progressively increasing between zero pounds per square inch (0 psi) and ten pounds per square inch (10 psi). The composite material 10 may then be laminated for two (2) to three (3) minutes at a pressure progressively increasing to approximately ninety pounds per square inch (90 psi). The composite material may subsequently be laminated for approximately thirty (30) minutes at a pressure progressively increasing to a value in the range of three hundred to four hundred pounds per square inch (300–400 psi).

After the composite material 10 has been laminated as described in the previous paragraph, the composite material may be annealed. The annealing cycle may be dependent upon the parameters of the composite material such as those specified in the previous paragraph. For example, under the circumstances described in the previous paragraph, an annealing cycle may be provided for a period of approximately sixty (60) hours. In this annealing cycle, the composite material may be annealed at a suitable temperature such as approximately 180° F. for a suitable period such s approximately ten (10) hours, then at a suitable temperature such as approximately 212° F. to 220° F. for a suitable period such as approximately eight (8) hours, then at a suitable temperature of approximately 225° F. for a suitable time period such as approximately ten (1) hours, thereafter at a suitable temperature such as approximately 250° F. to 260° F. for a suitable period such as approximately four (4) hours and finally at a suitable temperature such as approximately 260° F. for the remaining period such as approximately eighteen (18) hours. The composite material 10 may then be cooled to ambient temperatures.

The annealing of the composite material 10 after the lamination of the composite material under heat and pressure offers certain important advantages. By annealing the composite material 10, moisture in the composite material 10 is eliminated. This prevents pockets of foreign material such as water from remaining in the composite material 10 after the formation of the composite material. Such foreign pockets are undesirable because they limit the ability of the composite material to be formed into complex shapes without rippling or buckling. The annealing of the composite material is also advantageous because it eliminates unreactive monomers either as volatiles or as material converted to polymer unrelated monomers and causes all of such unrelated monomers to be converted to polymers.

Although the thickness of the core 16 is preferably less than the aggregate thickness of the layers 12 and 14 and the thermoplastic layers 18 and 20, it will be appreciated that the thickness of the core 16 may be equal to, or greater than, the aggregate thickness of the other layers. For example, the thickness of the core 16 may be increased above the thickness of the other layers when it is desired to provide the composite material 10 with somewhat compliant 4 properties.

When the composite material 10 has been formed into sheets as described above and is thereafter to be converted into a complex shape, the material may be disposed in a mold having the desired shape and may be subjected to a suitable temperature and pressure to move the sheet into conformity with the shape of the mold. The composite material 10 has certain distinct advantages while it is being formed into the desired shape and after it has been so formed. During such formation, the layers 12 and 14 of the fabric material provide a body to the composite material. The core 16 provides for a movement between the layer 12 on one side of the core independently of the movement of the layer 14 on the other side of the core.

In this way, the composite material 10 can be formed into any desired shape without any rippling or buckling of the composite material or the fabric material. This is important in insuring that the composite material 10 will occupy only a minimal amount of space and will be comfortable to the user such as when it is formed into an orthotic insert. It is also important in insuring that the composite material 10 will have an optimal flexural strength, stiffness and rigidity after it has been formed into the desired shape.

The flexural load, stiffness and rigidity of the composite material 10 may be controlled dependent upon the total thickness of the layers 12 and 14 of the fabric material relative to the total thickness of the composite material. For example, as the total thickness of the layers 12 and 14 of the fabric material increases relative to the total thickness of the composite material 10, the stiffness, strength and rigidity of the composite material 10 tend to be enhanced while the ability of the composite material to be conformed to complex shapes tends to be reduced. When the composite material 10 is formed as described above, the thermoplastic material of the layers 18 and 20 encapsulates and impregnates the fabric or fibers in the layers 12 and 14 of the fabric material and bonds the fabric or fibers to the core 16. the layer 18 is also bonded to the layer 30 of urethane.

Figure 1:
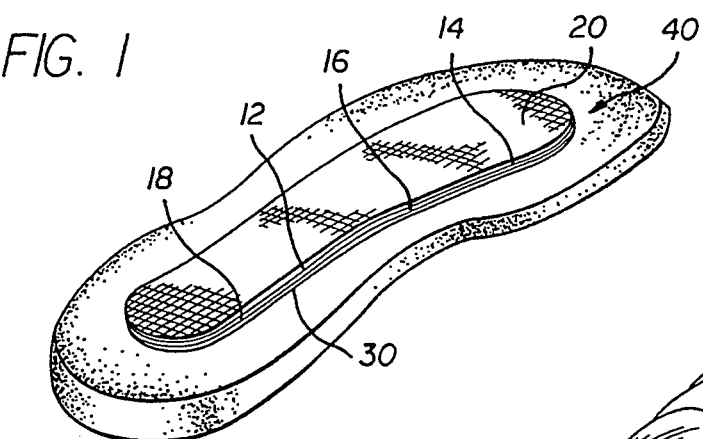
FIG. 1 is a schematic perspective view, partially broken away, of a completed orthotic insert constructed from a thermoplastic thermoformable composite material in accordance with the teachings of this invention.
Figure 2:
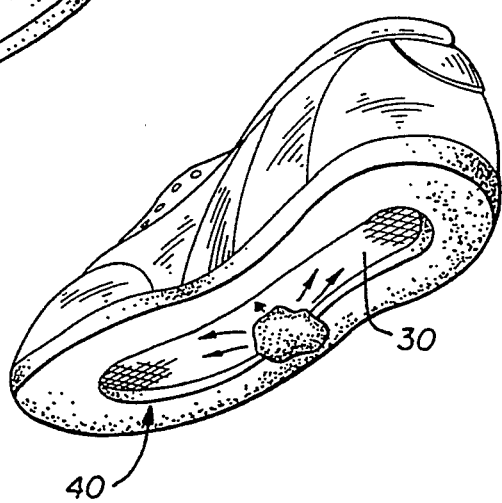
FIG. 2 is a perspective view of a shoe incorporating the orthotic insert of FIG. 1.
Figure 3:
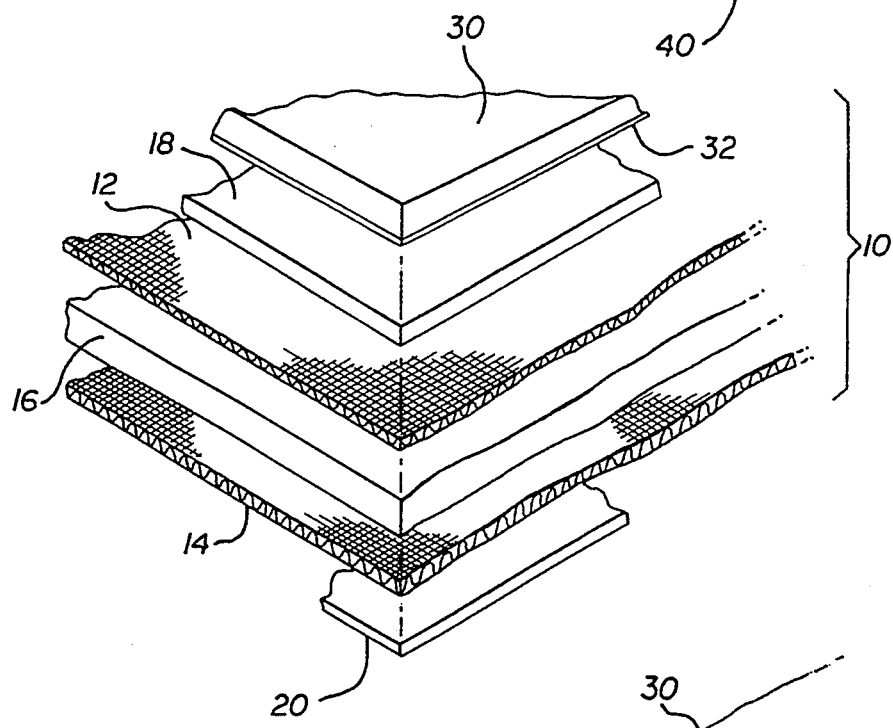
FIG. 3 is an enlarged exploded fragmentary schematic perspective view of the various materials used to form the thermoplastic thermoformable composite material constituting this invention.

FIGS. 1 and 2 schematically show an orthotic member generally illustrated at 40. The orthotic member 40 may be disposed externally on the sole 44 of a shoe generally indicated at 36. It will be seen that the layer 30 provides the external surface of the orthotic member. The layer 30 provides protection to the wearer of the shoe against the adverse effects resulting from the impact of small rocks and pebbles when the wearer is walking jogging or running. These small rocks and pebbles become catapulted into the air by the impact of the shoe against the ground. Among other features, the layer 30 provides abrasion resistance and high impact strength to the shoe 36 at the position of the orthotic insert 40.

FIG. 1 also illustrates that the orthotic member 40 formed from the composite material 10 has a complex shape conforming to the sole of the wearer's shoe. Each such orthotic member 40 has to be made for a snug fit on the sole of the wearer's shoe. As will be appreciated, the orthotic member 40 may have different shapes and sizes to conform to the different shapes and sizes of the soles in individual shoes. It will be appreciated that the orthotic member 40 may be shaped to be disposed in the arch support portion of the shoe.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. A thermoplastic thermoformable composite material for shaping into a complex form without rippling or buckling, including,
    a core of a thermoplastic material,
    layers of a fabric material respectively positioned at opposite sides of the core of the thermoplastic material,
    additional layers of a thermoplastic material enveloping and impregnating the layers of the fabric material,
    the core of the thermoplastic material being provided with a sufficient thickness to obtain a movement of the layers of the fabric material independently of each other during the shaping of the composite material into the complex form, and
    a further layer of a thermoplastic material bonded to one of the additional layers of the thermoplastic material and having properties to enhance the abrasion resistance and impact strength of the composite material,
    a shoe having a sole,
    the thermoplastic composite material being disposed in the sole of the shoe with the further layer of the thermoplastic material facing outwardly from the shoe.

2. A thermoplastic thermoformable composite material, including,
    a thermoplastic thermoformable resin material defining a core,
    a first layer of a fabric material positioned on one side of the core,
    a second layer of a fabric material positioned on the other side of the core,
    a first additional layer of a thermoplastic material enveloping the first layer of the fabric material and impregnating the first layer of the fabric material and bonding the first layer of the fabric material to the core,
    a second additional layer of a thermoplastic material enveloping the second layer of the fabric material and impregnating the second layer of the fabric material and bonding the second layer of the fabric material to the core,
    the thermoplastic thermoformable core being of a sufficient thickness to provide for a shaping of the thermoplastic composite material at an elevated temperature,
    the first and second layers of the fabric material being of a sufficient thickness to impart strength and rigidity to the thermoplastic thermoformable composite material, and
    a layer of a thermoplastic elastomer bonded to the first additional layer of the thermoplastic material to provide impact and abrasion resistance to the thermoplastic composite material,
    a shoe having a sole, and
    the thermoplastic composite material being disposed in the sole of the shoe with the thermoplastic elastomer facing outwardly from the shoe.

3. A thermoplastic thermoformable composite material including,
    a thermoplastic material defining a core and having first and second opposite flat surfaces,
    a first layer of a fabric material disposed on the first flat surface of the core,
    a second layer of a fabric material disposed on the second flat surface of the core,
    a first layer of a thermoplastic material disposed on the first layer of the fabric material and impregnating the first layer of the fabric material and bonding the first layer of the fabric material to the core,
    a second layer of a thermoplastic material disposed on the second layer of the fabric material and impregnating the second layer of the fabric material and bonding the second layer of the fabric material to the core, and
    a layer of a thermoplastic elastomer disposed on the first layer of thermoplastic material to act as a shock absorber against the impact of particles,
    the core having a thickness relative to the total thickness of the layers of the fabric material and the layers of the thermoplastic material and the layer of the thermoplastic elastomer to provide for a shaping of the composite material at the elevated temperature, and
    the layers of the fabric material having a thickness relative to the thermoplastic composite material to impart strength and rigidity to the thermoplastic composite material.

a shoe having a sole, the thermoplastic composite material being shaped and being disposed in the sole of the shoe with the layer of the thermoplastic elastomer facing outwardly.

4. A thermoplastic thermoformable composite material, including, a thermoplastic material defining a core and having first and second opposite surfaces, a first layer of a fabric material disposed on the first surface of the core, a second layer of a fabric material disposed on the second surface of the core, a first layer of a thermoplastic material disposed on the first layer of the fabric material and impregnating the first layer of the fabric material and bonding the first layer of the fabric material to the core, a second layer of a thermoplastic material disposed on the second layer of the fabric material and impregnating the second layer of the fabric material and bonding the second layer of the fabric material to the core, the layers of the fabric material and the layers of the thermoplastic material being provided with relative thicknesses to provide for the shaping of the composite material at elevated temperatures, without any rippling or buckling of any of the layers, to impart strength and rigidity to the composite material and to maximize the load to bend the composite material, and an additional layer of a thermoplastic material disposed on the first layer of the thermoplastic material and having properties to enhance the abrasion resistance and impact strength of the thermoplastic composite material, a shoe having a sole, the thermoplastic composite material being disposed in the sole of the shoe with the additional layer of the thermoplastic material facing outwardly.

5. A thermoplastic thermoformable composite material, including, a thermoplastic material defining a core and having first and second opposite surfaces, a layer of a fabric material disposed on the first surface of the core, a first layer of a thermoplastic material disposed on the first layer of the fabric material and impregnating the first layer of the fabric material and bonding the first layer of the fabric material to the core, the layer of the fabric material and the layer of the thermoplastic material being provided with relative thicknesses to provide for the shaping of the composite material at elevated temperatures without any rippling or buckling of any of the layers, to impart strength and rigidity to the composite material and to maximize the load to bend the composite material, and an additional layer of a thermoplastic material disposed on the first layer of the thermoplastic material and having properties to enhance the abrasion resistance and impact strength of the composite material, the thermoplastic material for the core and for the first layer is made from a material selected from the group consisting of acrylic, polycarbonate and ABS, the thermoplastic material for the core and for the first thermoplastic layer is obtained from the group consisting of acrylic, polycarbonate and ABS and wherein the additional layer of the thermoplastic material is a urethane, a shoe having a sole, the thermoplastic composite material being disposed in the sole of the shoe with the additional layer of the thermoplastic material facing outwardly.

* * * * *